(No Model.)

H. JOHNSON.
LATHE CHUCK.

No. 310,060. Patented Dec. 30, 1884.

Witnesses
William Scott
Jn. S. Bellows

Hans Johnson,
Inventor
per Brown Bro.
Attorneys

UNITED STATES PATENT OFFICE.

HANS JOHNSON, OF BOSTON, ASSIGNOR TO DAVID E. BANGS, OF MEDFORD, MASSACHUSETTS.

LATHE-CHUCK.

SPECIFICATION forming part of Letters Patent No. 310,060, dated December 30, 1884.

Application filed April 30, 1884. (No model.)

*To all whom it may concern:*

Be it known that I, HANS JOHNSON, of Boston, in the county of Suffolk and State of Massachusetts, have invented certain new and useful Improvements in Lathe-Chucks, of which the following is a full, clear, and exact description.

This invention relates to a lathe or center chuck; and it consists, in combination with two or more jaws constructed and arranged to move in radial slots in the end of a stock or spindle, of a sleeve arranged to screw onto said spindle and engage with said jaws, for the purpose and all substantially as hereinafter fully described.

Figure 1:
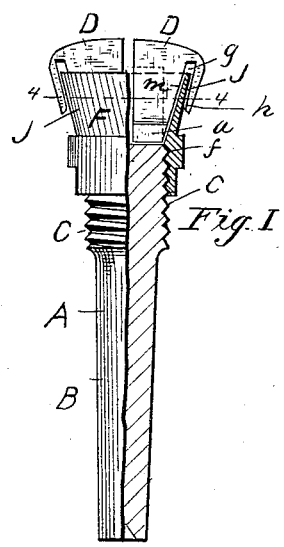
Figure 2:
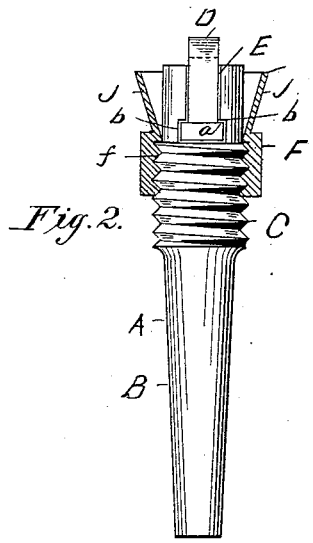
Figure 3:
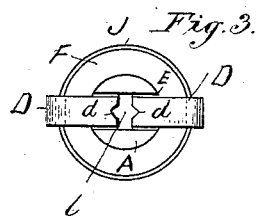
Figure 4:
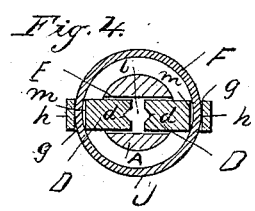

In the accompanying plate of drawings, Figures 1 and 2 are views in side elevation and partial vertical section of a lathe or center chuck made according to this invention; Fig. 3, a front view; Fig. 4, a cross-section on line 4 4, Fig. 1.

In the drawings, A represents a stock or spindle adapted at its portion B to fit within a lathe-center or other holder, and having an external screw-thread, C.

D D are two jaws arranged to slide back and forth in a transverse radial slot, E, in the front end of said spindle, and having shoulders $a$, fitting a corresponding enlargement, $b$, of the inner end of the slit E, which prevents endwise movement or escape of the jaws D D from the slot E. The inner end of each jaw has a depression, $d$, between which depressions a drill or other tool may be placed, to be held by the chuck.

F is a sleeve or collar having an internal screw-thread, $f$, adapted to screw onto the outside of the stock. The outer portion, $j$, of this sleeve is flaring, as shown, and is adapted to lie within an open slot, $g$, in each of the jaws D D, which slot $g$ is of a corresponding angle to the flaring portion $j$. Screwing this sleeve onto the spindle or stock, with the jaws in place and engaged therewith, forces, by its flaring edge $j$ bearing against the outer portion, $h$, of the jaws, the jaws to move outward, and thus enlarges the opening $l$ between the jaws, for the insertion of any drill-tool or other article, and screwing said sleeve outward forces said jaws together by bearing against the side $m$ of said slot, and securely clamps and holds said tool, &c., between the jaws.

More than two jaws can be used, if desired; but two are practical, and for light work are sufficient.

Having thus described my invention, what I claim is—

The combination, with a stock or spindle, A, having an external screw-thread and radial slots E, in which are arranged to slide jaws D D, having flaring open slots $g$, of a sleeve adapted to screw onto said spindle, and having a flaring portion, $j$, to engage with said slot $g$, substantially as and for the purpose specified.

In testimony whereof I have hereunto set my hand in the presence of two subscribing witnesses.

HANS JOHNSON.

Witnesses:
EDWIN W. BROWN,
WM. S. BELLOWS.